United States Patent [19]
Froemming et al.

[11] Patent Number: 5,782,294
[45] Date of Patent: Jul. 21, 1998

[54] COOLED LINER APPARATUS

[75] Inventors: Kenneth W. Froemming, Indianapolis, Ind.; James W. Vehr, Palm Beach Gardens, Fla.; Caesar G. Mamplata, Jupiter, Fla.; Alfredo Cires, Palm Beach Gardens, Fla.

[73] Assignee: United Technologies Corporation, Hartford, Conn.

[21] Appl. No.: 573,926

[22] Filed: Dec. 18, 1995

[51] Int. Cl.$^6$ .................................................. F08C 7/12
[52] U.S. Cl. .............................. 165/168; 60/752; 60/754
[58] Field of Search .............................. 165/168, 908; 60/752, 755, 757

[56] References Cited

U.S. PATENT DOCUMENTS

| | | | |
|---|---|---|---|
| 4,071,194 | 1/1978 | Eckert et al. | 239/127.3 |
| 4,422,300 | 12/1983 | Dierberger et al. | 60/757 |
| 4,555,901 | 12/1985 | Wakeman et al. | 60/39.32 |
| 4,695,247 | 9/1987 | Enzaki et al. | 431/352 |
| 5,083,422 | 1/1992 | Vogt | 60/39.02 |
| 5,209,059 | 5/1993 | Ward | 60/261 |
| 5,307,637 | 5/1994 | Stickles et al. | 60/756 |
| 5,328,331 | 7/1994 | Bunker et al. | 416/96 R |
| 5,333,443 | 8/1994 | Halila | 60/39.31 |
| 5,363,643 | 11/1994 | Halila | 60/39.31 |
| 5,363,654 | 11/1994 | Lee | 60/752 |
| 5,435,139 | 7/1995 | Pidcock et al. | 60/757 |
| 5,528,904 | 6/1996 | Jones et al. | 60/753 |
| 5,598,697 | 2/1997 | Ambrogi et al. | 60/39.02 |
| 5,605,046 | 2/1997 | Liang | 60/752 |

FOREIGN PATENT DOCUMENTS 2087065  5/1982  United Kingdom ............ 60/757

*Primary Examiner*—Allen J. Flanigan
*Attorney, Agent, or Firm*—Richard D. Getz

[57] ABSTRACT

A liner apparatus is provided which includes an inner wall, a plurality of fasteners extending out from the inner wall, an impingement sheet attached to the inner wall by the fasteners, apparatus for spacing the inner wall and the impingement sheet a distance apart, and apparatus for sealing between the inner wall and the impingement sheet along an edge of the liner.

11 Claims, 2 Drawing Sheets

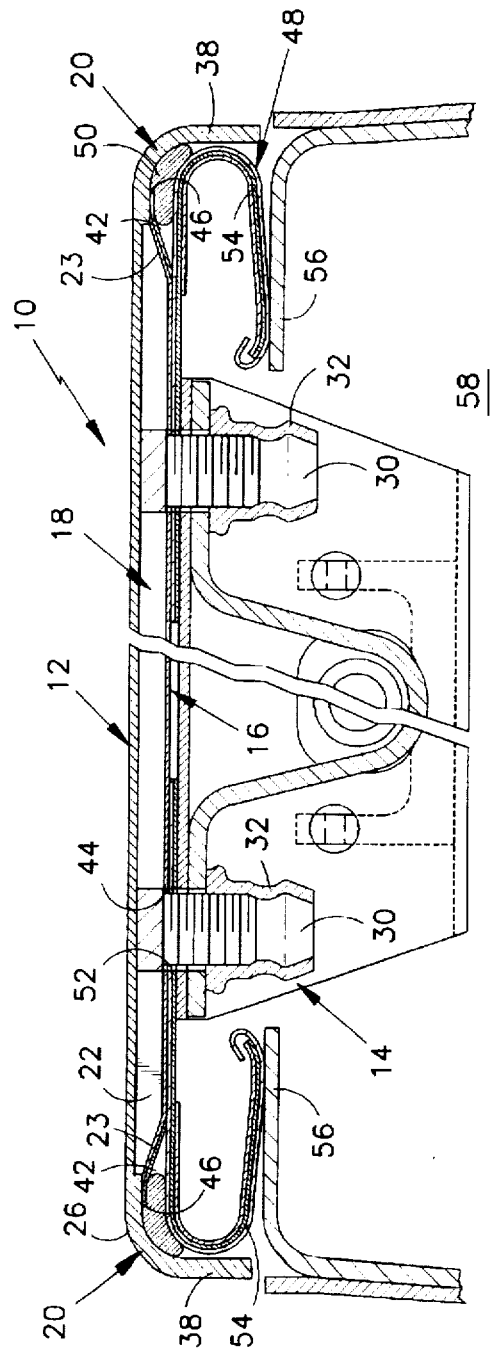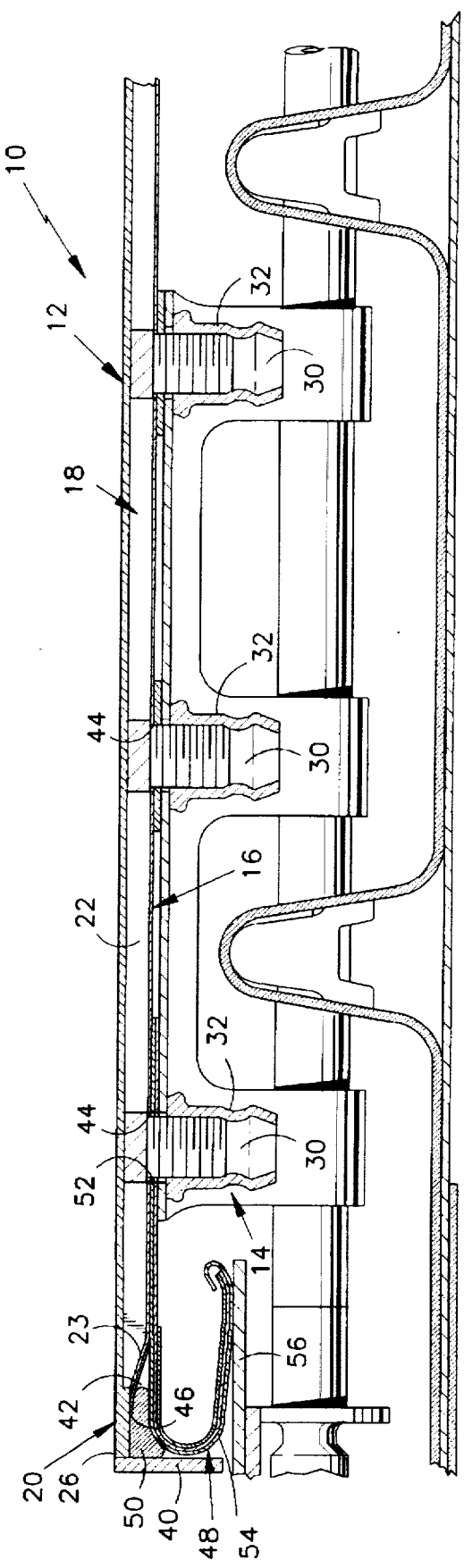

COOLED LINER APPARATUS

The invention was made under a U.S. Government contract and the Government has rights herein.

BACKGROUND OF THE INVENTION

1. Technical Field

This invention relates to gas turbine engines in general, and to cooled liner apparatus for gas turbine engines in particular.

2. Background Information

It is known to use liners to contain gas flow passing through the core of a gas turbine engine or passing downstream of the engine within the aircraft frame. Liners typically include an outer wall and an inner wall spaced apart from one another, held together by fasteners. Downstream of the combustor section, liners must be cooled because of heat transferred from hot core gas flow. Air bled off of the fan section at a temperature lower and a pressure higher than that of the core gas flow is often used as a cooling medium. Specifically, the cooling air is ducted to a plenum outside the liner and the pressure difference between the cooling air and the core gas flow forces the cooling air through apertures within the liner. Some of the work done by the fan section to pressurize the cooling air is lost during the cooling process. It is, therefore, a considerable advantage to minimize the amount of cooling air necessary to cool the liners.

A well known method for cooling a liner is impingement cooling. Impingement cooled liners have small diameter apertures in the outer wall and large diameter apertures in the inner wall, relatively speaking. The difference in aperture diameter between the inner and outer walls causes a greater portion of the pressure difference across the liner to occur across the outer wall. The relatively large pressure difference across the outer wall causes the cooling air to jet through the outer wall and impinge on the back of the inner wall. The relatively small pressure difference across the inner wall allows the cooling air to bleed out and form a layer of cooling air along the surface of the inner wall, between the inner wall and the passing core gas flow.

Impingement cooling requires continuity in the cross-sectional area of the apertures within the inner and outer walls because of the pressure differences associated with the differences in aperture cross-sectional area. Thermal coatings are often sprayed on the core gas side of inner walls as protection against the thermal energy of the core gas flow. After the coatings are sprayed, the apertures within the inner wall must be cleared of the coating. In most cases, the apertures must be cleaned from the inside of the inner wall to avoid damaging the coating applied to the core gas side of the inner wall. In many prior art liners, apertures cannot be accessed from the inside of the inner wall and therefore cannot be cleaned. Apertures not adequately cleaned of coating can change the flow of cooling air with adverse results.

Impingement cooling also requires good sealing within the liner edges. The relatively small pressure difference across the inner wall must be maintained over a variety of thermal conditions. If adequate sealing is provided at a lower temperature but not at a higher temperature because of thermal growth within the liner, the pressure difference across the inner wall could drop and permit undesirable hot core gas inflow. An insufficient pressure difference across the inner wall caused by inadequate sealing at higher temperatures could be overcome by increasing the flow of the cooling air. Increasing the demand for cooling air decreases the efficiency of the engine, however.

What is needed is a liner apparatus capable of being coated, one having cooling air apertures that can be readily cleaned of coating, and one that uses a minimum of cooling air.

DISCLOSURE OF THE INVENTION

It is, therefore, an object of the present invention to provide a liner apparatus that may be coated and recoated with a coating.

It is another object of the present invention to provide a liner apparatus that may be cooled with a minimum of cooling air.

It is still another object of the present invention to provide a liner apparatus that is easily maintained.

It is still another object of the present invention to provide a liner apparatus that is easily manufactured.

It is still another object to provide a edge seal that can adjustably meter the amount of leakage out of an edge.

According to the present invention, a liner apparatus is provided which includes an inner wall, a plurality of fasteners extending out from the inner wall, an impingement sheet attached to the inner wall by the fasteners, means for spacing the inner wall and the impingement sheet a distance apart, and means for sealing between the inner wall and the impingement sheet along an edge of the liner.

The design of the present invention liner apparatus provides several advantages. The inner wall of the liner and the grid of ribs extending out from the inner wall provide the structural support for the liner. The rigidity provided by the inner wall and ribs prevent excessive flexure of the liner. As a result, coatings applied to the inner wall are subject to less bonding stress and consequently stay attached longer. The inner wall and ribs provide the further advantage of a lightweight liner apparatus. Specifically, the structural integrity of the inner wall and ribs obviates the need for a structurally strong, and therefore heavy, impingement sheet. The seal arrangement at the edges of the liner apparatus also help reduce the weight of the liner. The finger seals and seal members are used in place of the welded subassemblies traditionally used.

Another advantage of the present invention is that the liner apparatus can be readily disassembled for maintenance. From time to time it may be necessary to replace the coating on the core gas side of the inner wall. In those instances, the liner is disassembled, including the means for sealing along the edges, and the inner wall is cleaned. Subsequently, a new coating is applied and the apertures within the inner wall are purged of coating. Because the liner can be readily disassembled and all areas of the inner wall accessed from the inside (including the edges), all of the apertures can be easily cleaned. Maintaining all of the apertures within the inner wall free of coating helps insure adequate cooling within the liner.

Still another advantage of the present invention is the high degree of sealing between grid sections. Periodically higher than average pressure regions will form in the core gas flow passing by the inner wall. If, at the same time a lower than average cooling air region were to form within the liner adjacent the high pressure region, undesirable hot core gas would likely inflow and cause damage. Prior art liner designs where the inner and outer walls run parallel to one another with no flow separations in between are particularly susceptible to this phenomenom. To avoid the undesirable inflow, the present invention compartmentalizes the interior region between the inner wall and the impingement sheet into grid sections. The flexibility of the thin impingement allows the impingement sheet to form a tight seal with the ribs and avoid crossflow between grid sections. Cooling air passing into each grid section cannot pass over into other grid sections. As a result, each grid section is adequately pressurized to avoid hot core gas inflow.

These and other objects, features and advantages of the present invention will become apparent in light of the detailed description of the best mode embodiment thereof, as illustrated in the accompanying drawings.

BRIEF DESCRIPTION OF THE DRAWINGS

FIG. 3 is a diagrammatic cross-sectional view of a section of the liner apparatus, including an embodiment of the edge sealing means.

FIG. 4 is a diagrammatic cross-sectional view of a section of the liner apparatus, including another embodiment of the edge sealing means.

BEST MODE FOR CARRYING OUT THE INVENTION

Figure 1:
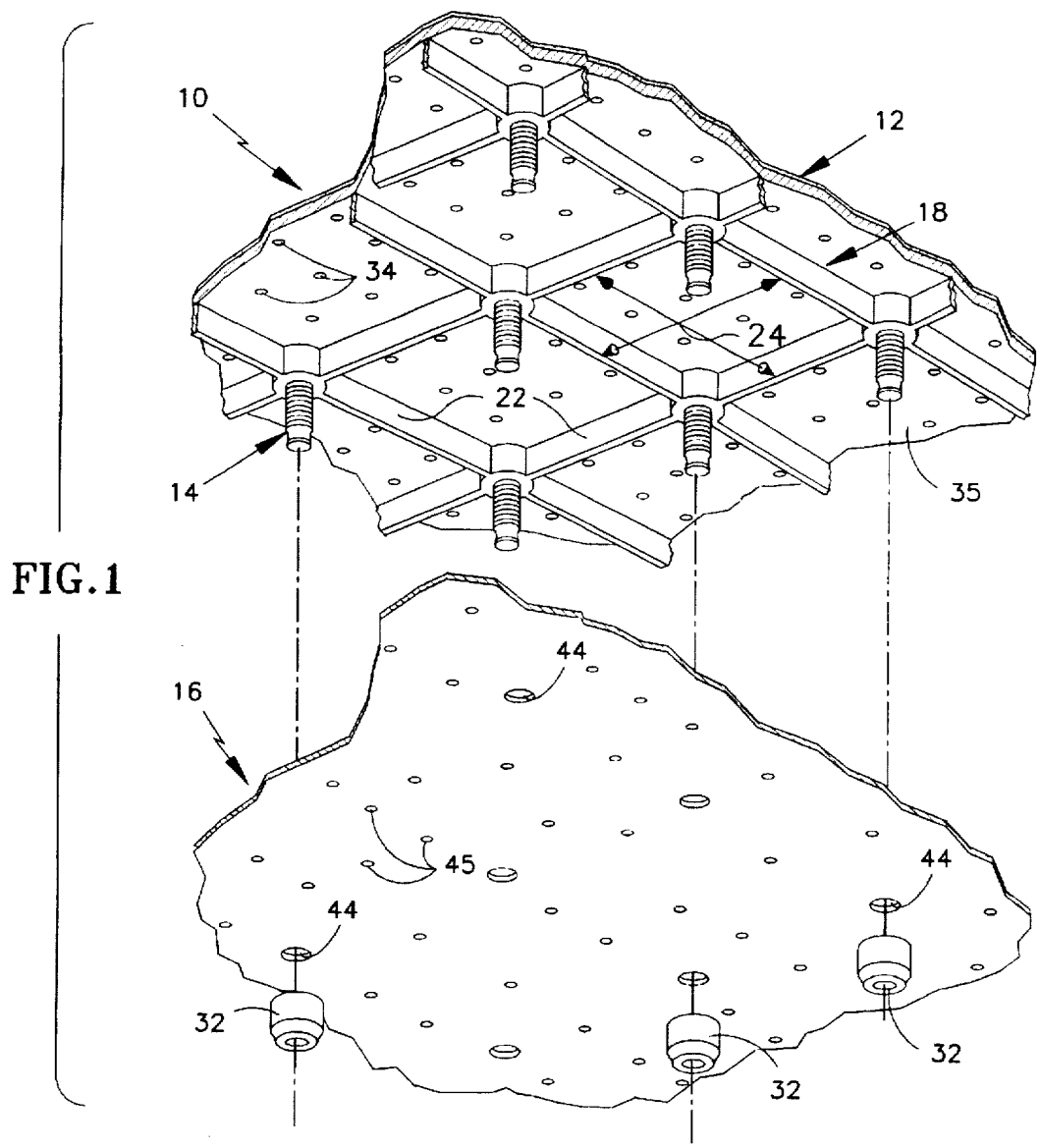
FIG. 1 is a diagrammatic exploded view of a section of the liner apparatus.

Referring to FIGS. 1-4, a liner apparatus 10 is shown having an inner wall 12, a plurality of fasteners 14, an impingement sheet 16, means 18 for spacing the inner wall 12 and the impingement sheet 16 a distance apart, and means 20 for sealing between the inner wall 12 and the impingement sheet 16 along an edge of the liner 10.

In the preferred embodiment, the inner wall 12 and the means 18 for spacing the inner wall 12 and the impingement sheet 16 a distance apart are formed as a single piece. The spacing means 18 includes a plurality of ribs 22 integrally formed with, and extending out from, the inner wall 12. The ribs 22 are arranged in a grid which includes a plurality of grid sections 24. The otherwise uniform height ribs 22 taper 23 down toward the inner wall 12 adjacent the edges 26 of the inner wall 12 (see FIGS. 3 and 4). A fastener 14 is attached to the inner wall 12 at each rib 22 intersection, extending outward substantially perpendicular to the inner wall 12. The fasteners 14 shown in FIGS. 1-4, are a crimp stud 30 type fastener and a crimp nut 32. Threaded studs and nuts (not shown) may be used alternatively. Each grid section 24 includes a plurality of first apertures 34. FIG. 2 shows a cross-section of the liner 10 with a coating 36 bonded to the core gas side of the inner wall 12.

FIG. 3 shows edge flanges 38 as an extension of the inner wall 12. The edge flanges 38 extend substantially perpendicular to the plane of the inner wall 12. FIG. 4 shows an alternative embodiment where independent edge flanges 40 are attached to the edge 26 of the inner wall 12 at a right angle. In both embodiments, the edge flange 38,40 and the taper 23 of the ribs 22 adjacent the edge flanges 38 create a channel 42 along the edge 26 of the inner wall 12.

Figure 2:
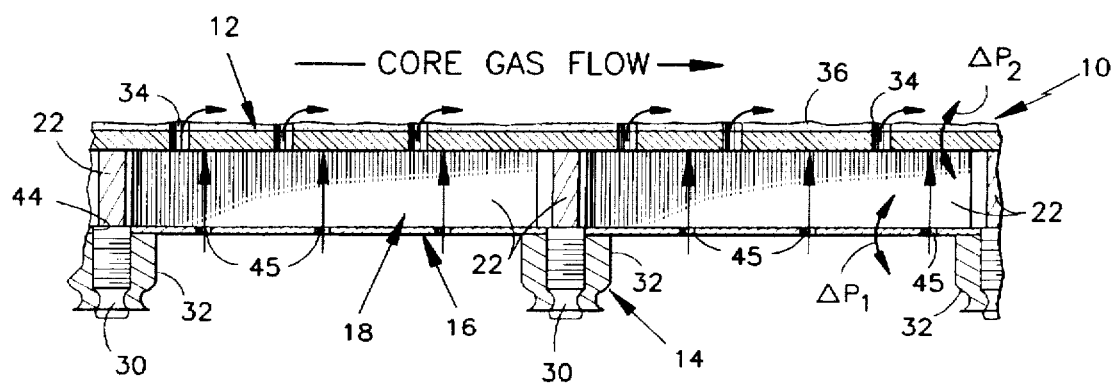
FIG. 2 is a diagrammatic cross-sectional view of a section of the liner apparatus.

Referring to FIGS. 1 and 2, the impingement sheet 16 includes a plurality of second apertures 44, each having a diameter large enough to receive one of the fasteners 14 extending out from the inner wall 12. The second apertures 44 are disposed in a pattern matching the positioning of the fasteners 14, such that the impingement sheet 16 can receive the fasteners 14 and be brought into contact with the ribs 22 extending out from the inner wall 12. The impingement sheet 16 further includes a plurality of third apertures 45.

The cross-sectional area of the third apertures 45 is substantially less than that of the first apertures 34 within the inner wall 12. The impingement sheet 16 is thin and lightweight relative to the inner wall 12. The edges 46 of the impingement sheet 16 are formed in a geometry similar to that of the ribs 22 tapering within the inner wall 12.

Referring to FIGS. 3 and 4, the means 20 for sealing between the inner wall 12 and the impingement sheet 16 along an edge of the liner 10 includes a finger seal 48 and a rope seal 50. The finger seal 48 includes at least one aperture 52 for receiving a fastener 14 and a hooked end 54. The rope seal 50 is a braided seal known in the prior art. The porosity of the rope seal 50 is chosen to allow an appropriate amount of cooling air to pass through to the opposite side of the seal 50. In alternative embodiments, a seal type other than a rope-type seal may be utilized.

In the assembly of the liner 10, the fasteners 14 extending out from the inner wall 12 are received within the second apertures 44 disposed within the impingement sheet 16, and the impingement sheet 16 is slid into contact with the ribs 22, between the edge flanges 38,40. The crimp nuts 32 are installed on all the studs 30, except those adjacent the edges 38, to fix the impingement sheet 16 in contact with the ribs 22. The rope seals 50 are subsequently placed in the channels 42 formed between the ribs 22 and the edge flanges 38.

The finger seals 48 are installed over the impingement sheet 16 along the edge of the inner wall 12. Crimp nuts 32 are subsequently installed on the studs 30 adjacent the edge, thereby fixing the impingement sheet 16 and the finger seals 48 to the inner wall 12 and capturing the rope seal 50 therebetween. In one embodiment, the shape of the finger seal 48 is such that it biases the rope seal 50 in contact with the inner wall 12, the impingement sheet 16, and the edge flange 38,40. In another embodiment, the liner apparatus 10 is mounted adjacent a seal land 56. The liner apparatus 10 is positioned such that the hooked end 54 of the finger seal 48 contacts the seal land 56. The seal land 56 forces the hooked end 54 into contact with the rope seal 50 which consequently contacts with, and seals against, the inner wall 12, the impingement sheet 16, and the edge flange 38,40.

Referring to FIGS. 2 and 4, when it becomes necessary to remove a coating applied to the core gas side of the inner wall 12 (see FIG. 2) and recoat the same, the assembly procedure described heretofore is essentially reversed. After the inner wall 12 is coated but prior to assembly, all of the first apertures 34 in the inner wall 12 are purged of coating with a cleaning process that approaches from the inside 35 of the inner wall 12. When disassembled from the liner 12, all of the first apertures 34 may be freely accessed for cleaning.

Referring to FIGS. 2 and 3, in the operation of the liner 10 cooling air is bled off of the fan or captured through a duct (not shown) and passed into the plenum 58 (see FIG. 3) outside the liner apparatus 10. The cooling air is at a lower temperature and a higher pressure than the core gas passing the inner wall 12 of the liner 10. The pressure difference across the liner 10 places a load on the liner 10 which can be broken into two discrete steps: a first pressure difference ($\Delta P_1$) across the impingement sheet 16 and a second pressure difference ($\Delta P_2$) across the inner wall 12. The magnitude of the pressure difference across the impingement sheet 16 is substantially greater than the magnitude of the pressure difference across the inner wall 12. The inner wall 12 and the integral ribs 22 extending out from the inner wall 12 provide the structural integrity necessary to prevent the liner 10 from buckling under the load. More specifically, the grid of ribs 22 supports the load transferred through the impingement sheet 16 by the pressure difference across the impingement sheet 16. Hence, the inner wall 12 provides the support for the liner 10 and the impingement sheet 16 meters cooling air flow into the liner 10.

The pressure difference across the liner 10 is necessary because it drives the cooling air through the liner 10 and thereby cools the liner 10. The edge sealing means 20 provides a simple, effective method for maintaining that difference by minimizing leakage along the edges of the liner 10. The edge sealing means 20 provides more than sealing within the liner 10, however. The edge sealing means 20 also provides a variable leak path via the rope seal 50 that can be altered according to application. The finger seals 48 sealing against the seal lands 56 also provide sealing for the plenum 58 outside of the liner 10.

Although this invention has been shown and described with respect to the detailed embodiments thereof, it will be understood by those skilled in the art that various changes in form and detail thereof may be made without departing from the spirit and scope of the claimed invention.

We claim:

1. A liner apparatus, comprising:

an inner wall;

an impingement sheet;

spacing means disposed between said inner wall and said impingement sheet;

wherein said inner wall and said impingement sheet are attached to one another and may be disassembled from one another, a finger seal, disposed adjacent an edge of said impingement sheet; and a seal member, disposed between said finger seal and said inner wall, said seal member substantially impeding the flow of cooling air exiting said liner between said impingement sheet and said inner wall.

2. A liner apparatus according to claim 1, further comprising:

an edge flange, attached to an edge of said inner wall, said edge flange extending substantially perpendicular to said inner wall;

wherein said seal member is disposed between and seals against said finger seal, said inner wall, and said edge flange.

3. A liner apparatus according to claim 2, wherein said seal member is a rope type seal.

4. A liner apparatus, comprising:

an inner wall, having a plurality of first apertures;

a plurality of fasteners, extending out from said inner wall;

an impingement sheet, having a plurality of second apertures for receiving said fasteners, and a plurality of third apertures, wherein each said first aperture has a cross-sectional area greater each said third apertures;

a plurality of ribs extending out from said inner wall, said ribs disposed in a grid having a plurality of grid sections, wherein said ribs space said inner wall and said impingement sheet a distance apart; and means for sealing between said inner wall and said impingement sheet along an edge of said liner.

5. A liner apparatus according to claim 4, wherein means for sealing between said inner wall and said impingement sheet comprises:

a finger seal, disposed adjacent an edge of said impingement sheet; and a seal member, disposed between said finger seal and said inner wall, said seal member substantially impeding the flow of cooling air exiting said liner between said impingement sheet and said inner wall.

6. A liner apparatus according to claim 5, further comprising:

an edge flange, attached to an edge of said inner wall, said edge flange extending substantially perpendicular to said inner wall;

wherein said seal member is disposed between and seals against said finger seal, said inner wall, and said edge flange.

7. A liner apparatus according to claim 6, wherein said seal member is a rope type seal.

8. A liner apparatus, comprising:

an inner wall, having a plurality of first apertures;

a plurality of fasteners, extending out from said inner wall;

an impingement sheet, having a plurality of second apertures for receiving said fasteners, and a plurality of third apertures, wherein each said first aperture has a cross-sectional area greater than each said third aperture;

means for spacing said inner wall and said impingement sheet a distance apart;

a finger seal, disposed adjacent an edge of said impingement sheet; and a seal member, disposed between said finger seal and said inner wall, said seal member substantially impeding the flow of cooling air exiting said liner between said impingement sheet and said inner wall.

9. A liner apparatus according to claim 8, further comprising:

an edge flange, attached to an edge of said inner wall, said edge flange extending substantially perpendicular to said inner wall;

wherein said seal member is disposed between and seals against said finger seal, said inner wall, and said edge flange.

10. A liner apparatus according to claim 9, wherein said seal member is a rope type seal.

11. A liner apparatus, comprising:

an inner wall, having a plurality of first apertures;

a plurality of fasteners, extending out from said inner wall;

an impingement sheet, having a plurality of second apertures for receiving said fasteners, and a plurality of third apertures, wherein each said first aperture has a cross-sectional area greater than each said third aperture;

means for spacing said inner wall and said impingement sheet a distance apart; and means for sealing between said inner wall and said impingement sheet along an edge of said liner;

wherein said liner apparatus may be readily disassembled such that said inner wall may be coated on a core gas side and said first apertures may be readily purged of coating from a side of said inner wall opposite said core gas side.

* * * * *